United States Patent
Rawat et al.

(10) Patent No.: US 12,311,762 B2
(45) Date of Patent: May 27, 2025

(54) ELECTRIC VEHICLE BATTERY MONITORING SYSTEMS AND METHODS

(71) Applicant: Ford Global Technologies, LLC, Dearborn, MI (US)

(72) Inventors: Swati Rawat, Mississauga (CA); Bhagyashri Satyabodha Katti, Novi, MI (US); Fling Finn Tseng, Ann Arbor, MI (US); Himanshu Verma, Farmington Hills, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 17/938,478

(22) Filed: Oct. 6, 2022

(65) Prior Publication Data
US 2024/0116363 A1    Apr. 11, 2024

(51) Int. Cl.
*B60K 35/00*    (2024.01)
*B60K 35/10*    (2024.01)
*B60K 35/28*    (2024.01)
*B60L 58/12*    (2019.01)

(52) U.S. Cl.
CPC .............. *B60K 35/00* (2013.01); *B60L 58/12* (2019.02); *B60K 35/10* (2024.01); *B60K 35/28* (2024.01); *B60K 2360/143* (2024.01); *B60K 2360/149* (2024.01); *B60K 2360/169* (2024.01); *B60L 2250/16* (2013.01)

(58) Field of Classification Search
CPC .. B60K 35/00; B60K 2360/149; B60K 35/28; B60K 2360/143; B60K 35/10; B60K 2360/169; B60L 58/12; B60L 2250/16
See application file for complete search history.

(56) References Cited

U.S. PATENT DOCUMENTS

| | | |
|---|---|---|
| 2012/0143410 A1 | 6/2012 | Gallagher et al. |
| 2013/0173097 A1 | 7/2013 | Jotanovic |

FOREIGN PATENT DOCUMENTS

| | | | | |
|---|---|---|---|---|
| AU | 2002319812 A1 | * | 4/2003 | ......... G06F 3/03547 |
| TW | 200837623 A | * | 9/2008 | ........... G06F 3/0481 |

OTHER PUBLICATIONS

Musabini, Influence of Adaptive Human-Machine Interface on Electric-Vehicle Range-Anxiety Mitigation, Feb. 14, 2020.*
Antonyo Musabini et al., Influence of Adapative Human-Machine Interface on Electric-Vehicle Range-Anxiety Mitigation, Multimodal Technologies and Interaction, Feb. 14, 2020, 1-22.
Roin Van Den Berg, How to Say Goodbye to EV Range Anxiety, Automotive World est 1992, Sep. 23, 2021, 1-6.

* cited by examiner

*Primary Examiner* — David P. Merlino
*Assistant Examiner* — Shivam Sharma
(74) *Attorney, Agent, or Firm* — Emily Drake; Eversheds Sutherland (US) LLP

(57) ABSTRACT

Electric vehicle battery monitoring systems and methods are disclosed herein. An example method includes displaying a state of charge for a battery of an electric vehicle on a display screen of the electric vehicle, determining a frequency of how often a user views the state of charge, inferring that the user has anxiety over a range for the electric vehicle based on the frequency, and presenting the user with options to extend the state of charge.

14 Claims, 3 Drawing Sheets

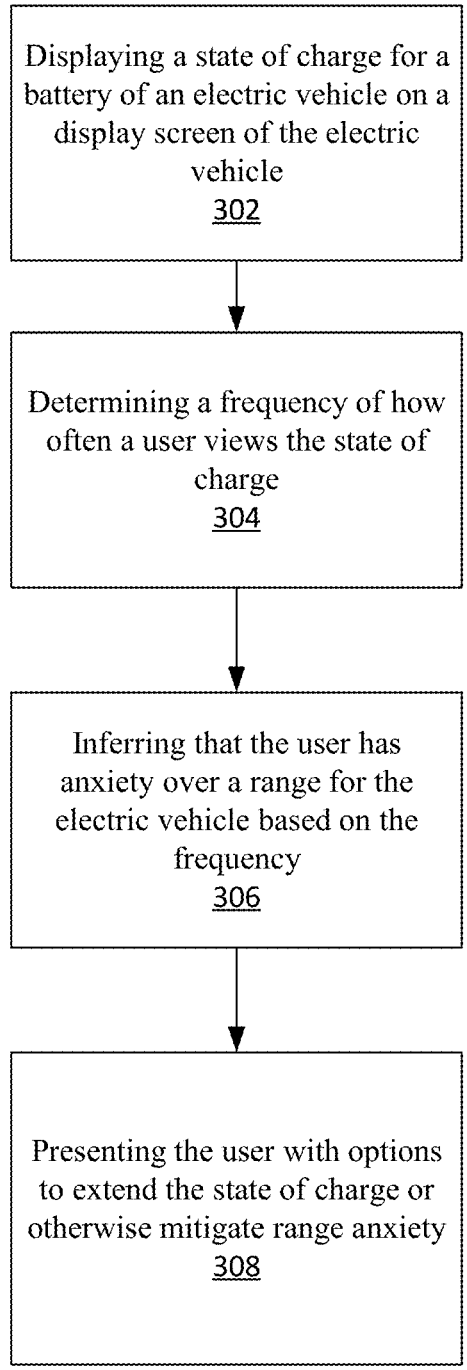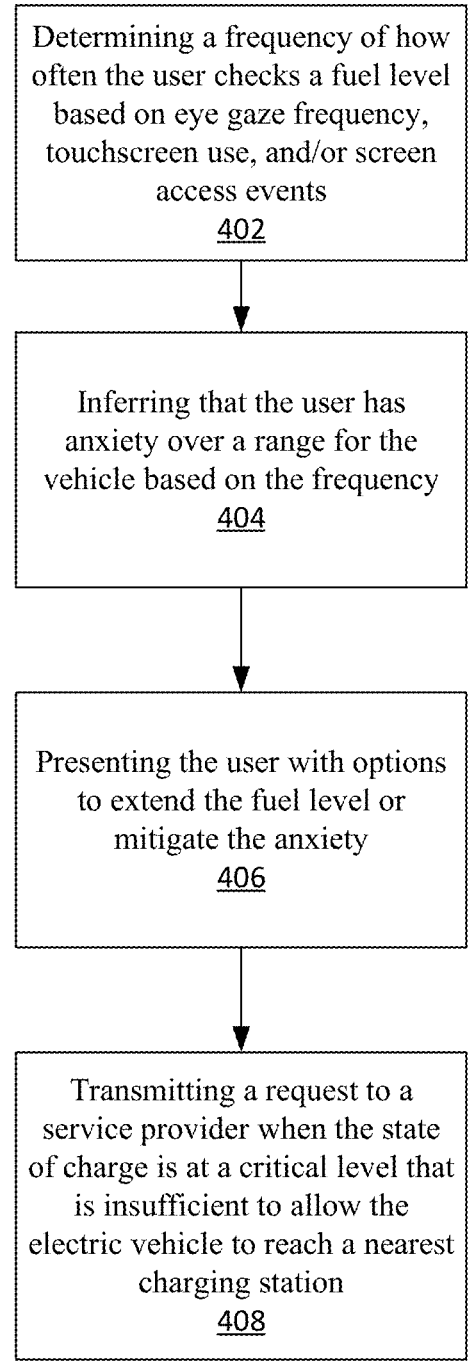
FIG. 3
FIG. 4

ELECTRIC VEHICLE BATTERY MONITORING SYSTEMS AND METHODS

BACKGROUND

Some users of electric vehicles (EV) may experience a phenomenon referred to as "range anxiety," which includes instances where a state of charge (SOC) of a battery of the electric vehicle is low. What constitutes a "low" SOC may vary from driver to driver. For example, a driver who has little or no experience with an EV may experience anxiety when taking a new route when the driver's perception is that the SOC is low. An unexpected change in an expected driving experience, such as getting stuck in a traffic jam, may cause the driver to worry, especially when a display screen indicates that the range/SOC is decreasing. The driver may experience anxiety and become concerned about getting stranded. The driver may also be disoriented if they have never been in the area before or when the user perceives that it may be difficult to find a charging station. Any of these scenarios may lead to decreased trust and confidence in using the EV.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 is a flowchart of an example method in accordance with one or more embodiments of the present disclosure.

FIG. 4 is a flowchart of another example method in accordance with one or more embodiments of the present disclosure.

DETAILED DESCRIPTION

Overview

Figure 1:
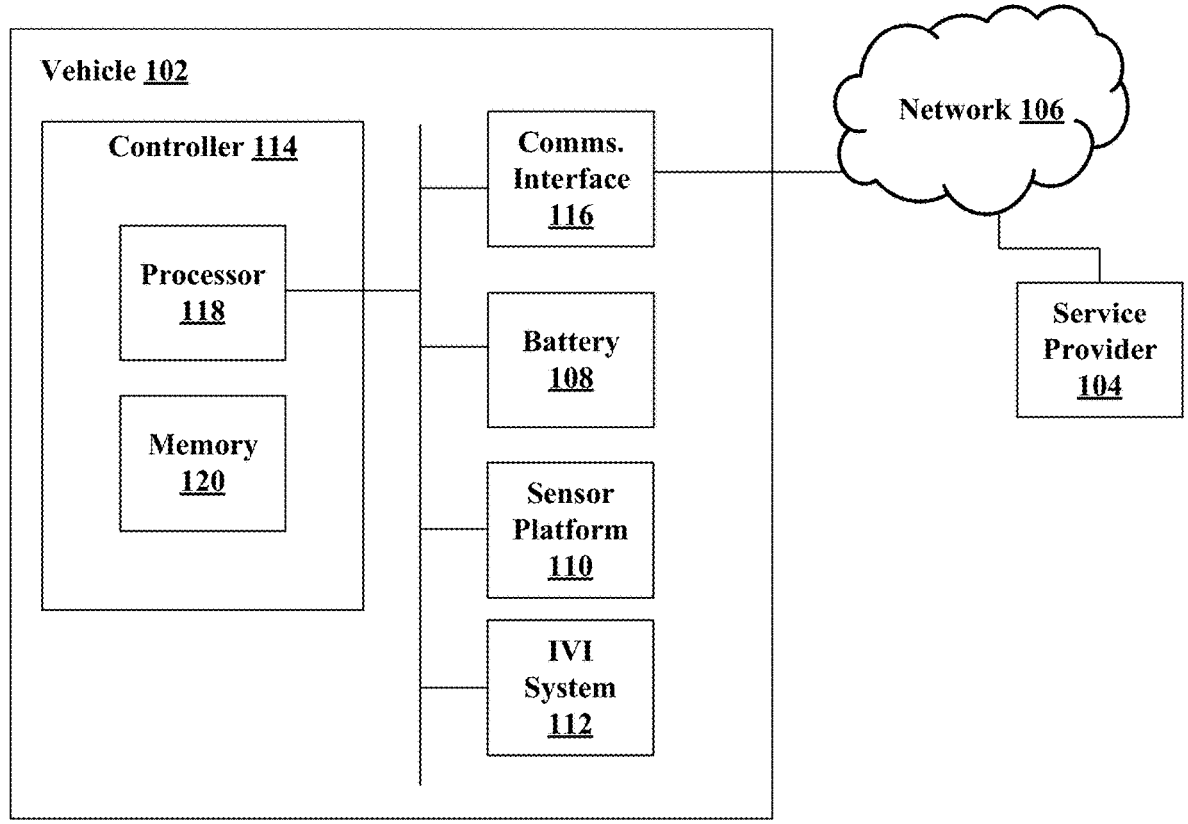
FIG. 1 is a perspective view of an example system in accordance with one or more embodiments of the present disclosure.

The present disclosure pertains to systems and methods for identifying and reducing EV range anxiety through the use of personalized and contextual recommendations. In one example, in-cabin cameras and/or other sensors can be used to track the driver actions such as eye gaze, touch, and head-position—just to name a few. The regions on a vehicle dashboard and an in-vehicle infotainment (IVI) screen (or equivalent user interface) that include SOC information can be fixed and the coordinates to these areas may be mapped.

Eye movements/gaze can be tracked continuously, and instances where the gaze of the driver aligns with the mapped region may be captured by the camera. A frequency of these gaze alignments can be counted and compared to a baseline, which is a reference point for comparison. For example, the baseline can include how often the user's gaze aligns with the mapped region when the SOC is full or sufficient. These levels can be determined empirically using modeling of other drivers or based on the unique behaviors of a particular driver. For example, some drivers may experience anxiety at a SOC level that is higher or lower than other drivers. This learning and updating may occur periodically.

In a particular scenario, when the EV charge is running low (e.g., based on a threshold comparison) it can be inferred that the driver is having EV anxiety when the driver looks at the mapped region more often than their usual frequency. This can be used as a trigger to initiate one or more steps to reduce anxiety. In another example, user touches of the IVI screen and/or the screens they visit can also be used to identify EV anxiety. The relative touches of the IVI screen relative to the normal baseline may also be used. In addition, if the user is visiting or transitioning to a screen that gives information about the EV charge, this can also be considered a trigger.

Other methods for identifying range anxiety may include, identifying that a driver has selected a vehicle mode of operation, such as eco drive mode or other onboard energy saving features (more frequently than normal). Another example can include monitoring biometric parameters of the driver such as blood pressure or pulse, which may indicate a heightened level of anxiety level. In yet another example, the system can identify when a driver behavior is peculiar such as a when a driver turns off the heating or cooling features of the vehicle when ambient temperatures would indicate that the driver would use these features. For example, if the outside ambient temperature is high, it would be expected for the driver to activate the cooling features of the vehicle. An increase in driver body temperature could also be used to confirm that the driver may have turned off cooling features based on range anxiety.

Various options to reduce anxiety can include, but are not limited to, providing changes to in-vehicle navigation during a journey, providing recommendations to driver behavior when the vehicle is parked or at a stop, providing recommendations before the user enters the vehicle (can include user behavior-based recommendations, in view of driving context), as well as recommendations or automated actions when the SOC is at or below a critical SOC threshold.

Illustrative Embodiments

Turning now to the drawings, FIG. 1 depicts a portion of a system 100 that includes a vehicle 102, a service provider 104, and a network 106. The vehicle 102 includes an electric vehicle, however, the aspects and features disclosed herein can be adapted for any vehicle that uses a fuel (e.g., gasoline, electricity, hydrogen, and so forth).

The vehicle can be adapted to identify when driver has anxiety related to a fuel range for the vehicle and help to reduce range anxiety and boost or preserve range as needed. The driver may feel more confident and relaxed. The features herein may also reduce the cognitive load for the driver such that they need not worry about fuel range or having to find a charging station if the vehicle becomes disabled.

In general, the vehicle 102 includes a battery 108, a sensor platform 110, an IVI system 112, a controller 114, and a communications interface 116. The battery 108 can include any battery that is used to power an electric vehicle. In general, the battery 108 can be monitored to determine a SOC that indicates a remaining range for the vehicle 102.

The sensor platform 110 can include in-vehicle cameras or other sensors, such as lasers, ultrasonic, radio frequency (RF), eye gaze tracking, and so forth. These various sensors can be used to detect the gaze of a driver. For example, output of the sensor platform (such as images from cameras)

can be used by the controller 114 to determine what the driver is looking at during vehicle operation, as will be discussed herein.

The IVI system 112 can include a display or instrument cluster (physical or virtual) that is located in view of the driver. Some examples include an instrument cluster that is above and behind the steering wheel. Other examples include a console display or heads-up display. The location of the IVI system 112 in the vehicle is not limiting to this disclosure.

Figure 2:
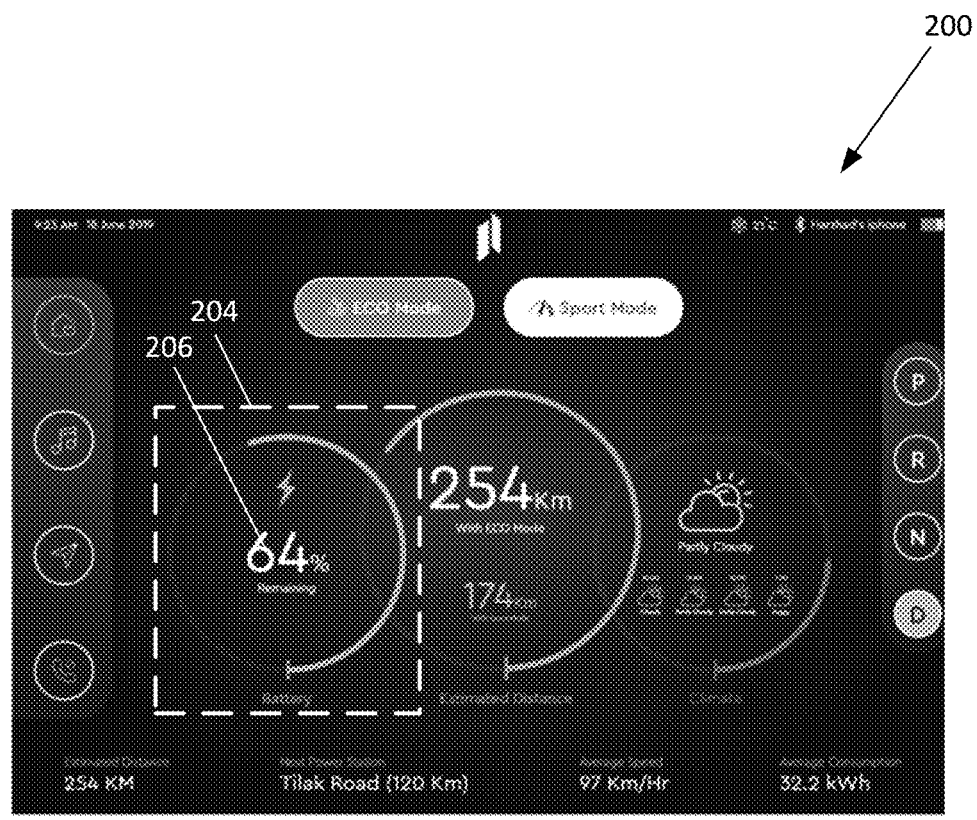
FIG. 2 is a screenshot of an example display and graphical user interface having a region with a state of charge displayed in accordance with one or more embodiments of the present disclosure.

Referring briefly to FIG. 2, a graphical user interface (GUI 200) can include an instrument cluster that includes a region 204 where the SOC 206 of the battery is displayed. The GUI 200 can have other areas or regions that include additional types of data such as vehicle speed, navigation, and other vehicle operating or drive time parameters. The IVI system 112 can identify coordinates, such as x and y Cartesian coordinates that define the region 204. These coordinates can be determined relative to the overall coordinates of the GUI 200. In general, the state of charge is presented in a region of the display screen defined by coordinates.

Referring back to FIG. 1, the controller 114 can include a processor 118 and memory 120. In some instances, the controller 114 can be configured to display (or cause the display by the IVI system 112) a state of charge for a battery of an electric vehicle on a display screen of the electric vehicle. The controller 114 can determine a frequency of how often a user views the state of charge. In one example, the controller 114 can track the eye gaze of the driver and determine how often they look at the SOC on the display. The controller 114 can infer that the user has anxiety over a range for the electric vehicle based on the frequency. The controller 114 may also present the user (or cause the presentation of) with options to mitigate their range anxiety, as will be discussed in greater detail herein.

The processor 118 executes instructions in the memory 120 to perform the methods disclosed herein. The controller 114 can be a stand-alone computing unit or can be integrated directly into the IVI system 112. It will be understood that when referring to operations performed by the controller, 114, this includes the execution of instructions by the processor 118. Also, the controller 114 can transmit and/or receive data over the network 106 as will be discussed in greater detail herein.

The controller 114 can receive output from the sensor platform 110 to identify a gaze direction of an eye(s) of the driver. For example, a camera mounted above the instrument cluster and the steering wheel can track the driver's gaze. The controller 114 can implement eye tracking algorithms that would be known to one of ordinary skill in the art to both identify the driver's eye(s) and track the gaze of the eye(s). The controller 114 can then correlate the gaze to coordinates of GUI or gauges on the instrument cluster. When the gaze of the driver aligns (could be within a tolerance level) with the coordinates of the region of the instrument cluster that correspond to the SOC for the battery 108, the controller 114 can determine that the driver has looked at this region of the instrument cluster and infer that the driver is interested in determining the current SOC of the battery.

Prior to the driver using the system, the controller 114 can establish a baseline gaze frequency for the driver. That is, when the SOC for the battery is high (e.g., above 90% or other threshold), the controller 114 can identify how frequently the driver looks at the SOC. This can establish a baseline frequency for the driver. In one example, the driver may only look at the SOC once every five minutes as a baseline.

As the driver operates the vehicle, the controller 114 can continuously (or periodically) track the gaze of the driver and determine how frequently the driver is looking at the SOC over time, as the SOC changes. The controller 114 can store and use the baseline frequency as a means to determine range anxiety. For example, if the controller 114 determines that the driver has looked at the SOC five times in one minute, the controller 114 may infer that the driver is having range anxiety. This threshold can be referred to as a gaze frequency threshold. In another example, when the driver looks at the SOC more than four times the baseline frequency, the controller 114 may infer that the driver is having range anxiety. These are but two examples of how range anxiety can be calculated, and are not intended to be limiting.

While gaze identification can be used, some vehicles may not be equipped with gaze sensing features. In another example, the IVI system 112 can include a touchscreen. For example, one part (or all) of the instrument cluster may receive and respond to touch input. The controller 114 can determine when the user touches a region of a touchscreen that includes the SOC information. In response, the controller 114 can determine when a number of the touches exceeds a touch frequency threshold to detect range anxiety.

In yet another example, the controller 114 can determine when the user selects a user interface that includes the state of charge. For example, the driver may have to push a button or scroll to access the SOC information. The controller 114 can be configured to determine when a number of times that the user has selected the user interface exceeds a screen selection frequency threshold. When the driver selects the SOC screen frequently, the driver may be experiencing range anxiety.

Once the controller 114 has determined or inferred that the driver may be experiencing range anxiety, the controller 114 can be configured to trigger a response. In some examples, the controller 114 can provide options or suggestions to the driver. In other examples, the controller 114 can actively control vehicle operating parameters such as governing acceleration or autonomous rerouting (with or without driver permission).

There can be multiple scenarios where the controller 114 can provide support to reduce anxiety. In one example, the controller 114 can make adjustments to navigation during operation. The controller 114 can provide (or cause a navigation system to provide) navigation-related suggestions to minimalize the usage of power/charge. The controller 114 can recommend a most efficient route to a nearest charging station. In another example, the controller 114 can plan a route based on driving conditions on a given day and a style of the driver behind the wheel.

The controller 114 can also provide real-time recommendations for available charging points on the route. In emergency situations, the controller 114 can abort the initially planned trip and provide a new trip/route to the charging station (if the station is within a few miles, for example).

In another example, the controller 114 can provide recommendations on driving style, activation/deactivation of certain features, and preemptive suggestions of charging stations. For example, the controller 114 can suggest that the driver turn off HVAC features. On-screen personalized recommendations may be provided for efficient energy use when the vehicle is waiting/parked. Based on the user's driving habits, recommendations can be provided on possible ways to extend the energy range. For example, turning off/disabling non-essential features/components that can help save power, driving at normal speeds with limited harsh braking and acceleration, and so forth.

If a driver has a high usage of HVAC systems, the controller 114 may recommend heating the car while it is charging to reduce the use of HVAC systems. An estimate of stop duration at the parking spot can allow charging activity to be scheduled and executed. The vehicle can recommend charging based on the predicted time that will be spent at the parking location. Battery percentages at which drivers charge their vehicles may vary for each user. These preferences can be determined based on historical data. For example, a user may prefer to recharge after 50% consumption whereas another user may prefer to recharge after reaching 20%. The controller 114 may recommend a list of nearby charging stations based on energy consumed depending on user preferences.

In some instances, the controller 114 can be configured to execute some options or responses (such as providing recommendations) prior to the driver entering the vehicle or prior to a journey. Before entering the vehicle, the controller 114 can recommend driver-appropriate departure times to avoid traffic so that minimal charge is used to undertake the journey. Before entering the vehicle, the controller 114 can provide recommendations based on past behavior and current context to prepare the vehicle for the journey.

Personalized departure time recommendations for improving range may be provided, especially in cold climates. The controller 114 can use departure time prediction to complete the charging just before the departure time to keep the battery warm. The controller 114 can also use departure time prediction to trigger cabin conditioning before the trip.

The controller 114 can also personalize arrival time recommendations to allow reserving a spot at the charging station. The arrival time predicted for the destination can be used by the driver to book a charging spot for the vehicle at that time at the service provider near the destination. The controller 114 can recommend best time and location for charging based on charger availability, charging speed, and user charging preferences—just to name a few.

In some instances, the controller 114 can be configured to provide options when the battery has a critically low SOC or during other similar emergency level scenarios. The controller 114 can provide recommendations to enable the vehicle to reach a charging station or get external help. The controller 114 can also provide a recommendation when the range goes very low/the charge goes off and the vehicle is expected to be stranded due to low SOC. Once the charge/battery capacity drops to a minimum threshold, the controller 114 automatically recommends an optimal drive mode to enhance performance and boost high-speed efficiency if the destination is not far.

The route, current SOC, and trip time information can be used by a service provider to know when and where the vehicle may need assistance and show up earlier to meet at the predicted location. The controller 114 can provide recommendations for quick roadside assistance options which may provide a charge so that vehicle can travel to the next charging station. That is, the controller 114 can transmit a request to the service provider 104 over the network 106 when the state of charge is at a critical level that is insufficient to allow the vehicle to reach a nearest charging station.

Controller 114 can recommend user to contact a trusted/emergency phone number. The controller 114 can also cause a telephonic system of the vehicle to automatically dial a contact number. For example, the controller 114 can suggest a helpline number or user's pre-selected contact from his/her phone book. In case of a helpline number, the controller 114 may share the users GPS co-ordinates and what3words coordinates to a central station or service provider. The station may dispatch a fully charged EV, from which the customer can charge their EV.

FIG. 3 is a flowchart of an example method of the present disclosure. The method can include a step 302 of displaying a state of charge for a battery of an electric vehicle on a display screen of the electric vehicle. As noted above, the display can include any display screen within the cabin of the vehicle. The SOC can include a current SOC of the battery, which is updated in real-time.

Next, the method can include a step 304 of determining frequency of how often a user views the state of charge. In more detail, this can include continuous eye gaze tracking of a driver to determine how often they are looking at the SOC information. The state of charge can be presented in a region of the display screen defined by coordinates. This step can include determining when a gaze of the user aligns with the coordinates.

The method can include a step 306 of inferring that the user has anxiety over a range for the electric vehicle based on the frequency. Inferring that the user has anxiety can include determining when the state of charge is below a gaze frequency threshold. Another example includes determining how frequently a gaze of the user aligns with coordinates of the state of charge presented on a display device.

The method can include a step 308 of presenting the user with options to extend the state of charge or otherwise mitigate range anxiety. Various examples include suggestions for modifying of driving behavior(s), adjustments to navigation plans, dispatch of service provider(s) and so forth. One option includes presenting the user with an updated navigation route having reduced battery consumption compared to a current navigation route. Another option includes presenting the user with a suggestion to adjust a vehicle feature or modify a driving behavior to reduce battery consumption. Another option can include presenting the user with a driving strategy to reduce battery consumption.

FIG. 4 is a flowchart of another example method. The method can include a step 402 of determining a frequency of how often the user checks a fuel level based on eye gaze frequency, touchscreen use, and/or screen access events. The vehicle can monitor a fuel level of a fuel system in real-time. Again, while examples here refer to electric vehicle fuel range, the range anxiety mitigation disclosed herein can involve vehicles using any fuel type.

In one example, a processor determines the frequency of how often the user checks the state of charge by determining how frequently a gaze of the user aligns with coordinates of the state of charge presented on a display device. In another example, a processor determines the frequency of how often the user checks the state of charge by determining when the user touches a region where the state of charge is displayed and determining when a number of the touches exceeds a touch frequency threshold. In yet another example, a processor determines the frequency of how often the user checks the state of charge by determining when the user selects a user interface that includes the state of charge and determining when a number of times that the user has selected the user interface exceeds a screen selection frequency threshold.

Once a frequency has been identified and analyzed, the method can include a step 404 of inferring that the user has anxiety over a range for the vehicle based on the frequency, as well as a step 406 of presenting the user with options to extend the fuel level or mitigate the anxiety. The method can include a step 408 of transmitting a request to a service provider when the state of charge is at a critical level that is insufficient to allow the electric vehicle to reach a nearest charging station.

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

While various embodiments have been described above, it should be understood that they have been presented by way of example only and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
    displaying, at a first time, a first state of charge information for a battery of an electric vehicle on a display screen of the electric vehicle, the first state of charge information indicative of the battery charge being above a first threshold;
    determining, based on gaze tracking using a camera of the electric vehicle, a first number of times a user of the electric vehicle views the first state of charge information for a first duration of time;
    displaying, at a second time after the first time, a second state of charge information for the battery on the display screen, the second state of charge information indicative of the battery charge being below a second threshold, the second threshold being lower than the first threshold;
    determining, based on the gaze tracking, a second number of times the user views the second state of charge information for the first duration of time;
    determining, that the second number of times is greater than the first number of times by a threshold value;
    determining, based on the second number of times being greater than the first number of times by the threshold value, a concern over a range of the electric vehicle;
    presenting the user with options to extend the range for the electric vehicle, wherein the options include adjusting a feature of the electric vehicle; and
    adjusting, based on the options to extend the range of for the electric vehicle, the feature of the electric vehicle.

2. The method according to claim 1, wherein the first state of charge information and the second state of charge information is presented in a region of the display screen defined by a set of coordinates.

3. The method according to claim 2, wherein determining, based on gaze tracking using a camera of the vehicle, the first number of times a user of the vehicle views the first state of charge information for a first duration of time, further comprising determining a number of times a gaze of the user aligns with the set of coordinates.

4. The method according to claim 2, further comprising determining a third number of times the region receives a touch input from the user.

5. The method according to claim 4, further comprising determining that the third number of times exceeds a touch frequency threshold.

6. The method according to claim 2, further comprising determining when the user selects another user interface that includes the first or the second state of charge information.

7. The method according to claim 6, further comprising determining that a third number of times that the user has selected the another user interface exceeds a screen selection frequency threshold.

8. The method according to claim 1, wherein one of the options includes presenting the user with an updated navigation route having reduced battery consumption compared to a current navigation route.

9. The method according to claim 1, wherein one of the options includes modify a driving behavior to reduce battery consumption, or wherein one of the options includes presenting the user with a driving strategy to reduce battery consumption or presenting the user with a recommendation of a charging station.

10. A system comprising:
    a processor, and
    a memory storing instructions that are executed by the processor to:
    display, at a first time, a first state of charge information for a battery of an electric vehicle on a display screen of the electric vehicle, the first state of charge information indicating that a battery charge is above a first threshold;
    determine, using a camera of the electric vehicle and gaze tracking, a first number of times a user of the electric vehicle looks at the first state of charge information during a first time period;
    display, at a second time, a second state of charge information for the battery on the display screen, the second state of charge information indicating that the battery charge is below a second threshold, wherein the second threshold is lower than the first threshold;
    determine, using the camera and the gaze tracking, a second number of times the user of the vehicle looks at the second state of charge information over the first time period;
    determine that the second number of times is greater than the first number of times by a threshold value;
    determine, based on the second number of times being greater than the first number of times by the threshold value, a concern over a range of the electric vehicle;
    present the user with options to extend the range, wherein the options include a suggestion to adjust a feature of the electric vehicle; and
    adjust, based on the suggestion, the feature of the electric vehicle.

11. The system according to claim 10, wherein the processor is configured to:

cause the first state of charge information to be displayed in a region of the display screen defined by set of coordinates; and determine, based on the camera and the gaze tracking, when a gaze of the user aligns with the set of coordinates.

12. The system according to claim 10, wherein the processor is configured to determine a third number of times the user touches a region of the display screen associated with the first or the second state of charge information, and determine when the third number of times exceeds a touch frequency threshold.

13. The system according to claim 10, wherein the processor is configured to determine a third number of times the user selects another user interface that includes the first or the second state of charge information and determine when the third number of times exceeds a screen selection frequency threshold.

14. The system according to claim 10, wherein the options further include any of:

presenting the user with an updated navigation route having reduced battery consumption compared to a current navigation route;

presenting the user with a suggestion to modify a driving behavior to reduce battery consumption;

presenting the user with a driving strategy to reduce battery consumption; and presenting the user with a recommendation of a charging station.

* * * * *